United States Patent [19]

Lucas et al.

[11] Patent Number: 4,866,519
[45] Date of Patent: Sep. 12, 1989

[54] METHOD AND APPARATUS FOR INCREASING THE VERTICAL DEFINITION OF A TRANSMITTED TELEVISION SIGNAL

[75] Inventors: Keith Lucas, Oak Ridges; William F. van Rassel, Willodale, both of Canada

[73] Assignee: Scientific Atlanta, Inc., Atlanta, Ga.

[21] Appl. No.: 92,305

[22] Filed: Sep. 2, 1987

[51] Int. Cl.$^4$ .............................................. H04N 7/12
[52] U.S. Cl. ................................... 358/140; 358/133; 358/141; 358/12; 358/138
[58] Field of Search ............... 358/141, 133, 140, 138, 358/11, 12, 13

[56] References Cited

U.S. PATENT DOCUMENTS

| | | | |
|---|---|---|---|
| 4,364,090 | 12/1982 | Wendland | 358/140 |
| 4,449,143 | 5/1984 | Dischert et al. | 358/140 X |
| 4,603,350 | 7/1986 | Arbeiter et al. | 358/140 |
| 4,622,577 | 11/1986 | Reitmeier et al. | |
| 4,661,850 | 4/1987 | Strolle et al. | |
| 4,672,424 | 6/1987 | Lechner | 358/11 |
| 4,713,688 | 12/1987 | Güttner | 358/141 |

FOREIGN PATENT DOCUMENTS 0176674  4/1986  European Pat. Off.
WO83/02704  4/1983  PCT Int'l Appl.

OTHER PUBLICATIONS

M. J. J. C. Annegarn, J. P. Arragon, G. de Haan, J. H. C. van Heuven and R. N. Jackson "HD-MAC: A step Forward in the Evolution of Television Technology", Aug. 8, 1987, pp. 197-212.

Heinz Sauerburger "Breit-und Schmalbandige Kompatible Einkanalige HDTV -Ubertragugn" Jan.-Feb. 1987, pp. 23-32 (English Translation Enclosed).

IBA Report 112/81 of May 1981 entitled The Sampling of Television Images.

"Direct Television Broadcasts by Satellite Desirability of a New Transmission Standard", K. Lucas and M. D. Windram, IBA Report 116/81, 09/81.

"Progress Report of HDTV in 1985", Masao Sugimoto, DOCT3/114, Jun. 10, 1986.

*Primary Examiner*—James J. Groody
*Assistant Examiner*—Victor R. Kostak
*Attorney, Agent, or Firm*—Banner, Birch, McKie & Beckett

[57] ABSTRACT

A method of enabling an increase in the vertical definition of a transmitted television signal while preserving its bandwidth including the steps of decimating alternate lines of the television signal and reinterpolating untransmitted alternate lines upon reception. The decimation is accomplished by diagonally filtering the television signal in two dimensions to form a figure of five sample structure. Every other line is then added to the line adjacent to it so that half the lines are available for transmission, each line comprising folded-in high frequency information about missing line samples. Prior to transmission, bnadwidth is converted by filtering the signal to be transmitted at a skew-symmetric low pass filter. Apparatus for encoding and decoding the television signal each includes a two dimensional diagonal filter and line switching and control circuitry. The storage of a full field of a sample data is not required for processing in accordance with the present method. Consequently the present apparatus comprises only line store means associated with the line switching and control circuitry of encoding apparatus.

22 Claims, 9 Drawing Sheets

FIG. 1 B-MAC SIGNAL
(PRIOR ART)
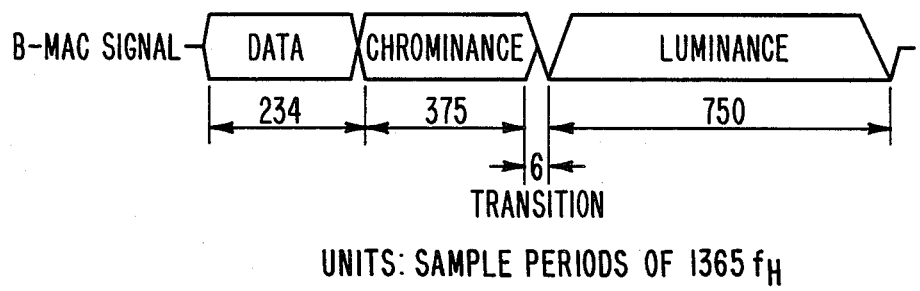
UNITS: SAMPLE PERIODS OF 1365 $f_H$
FIG. 2
(PRIOR ART)
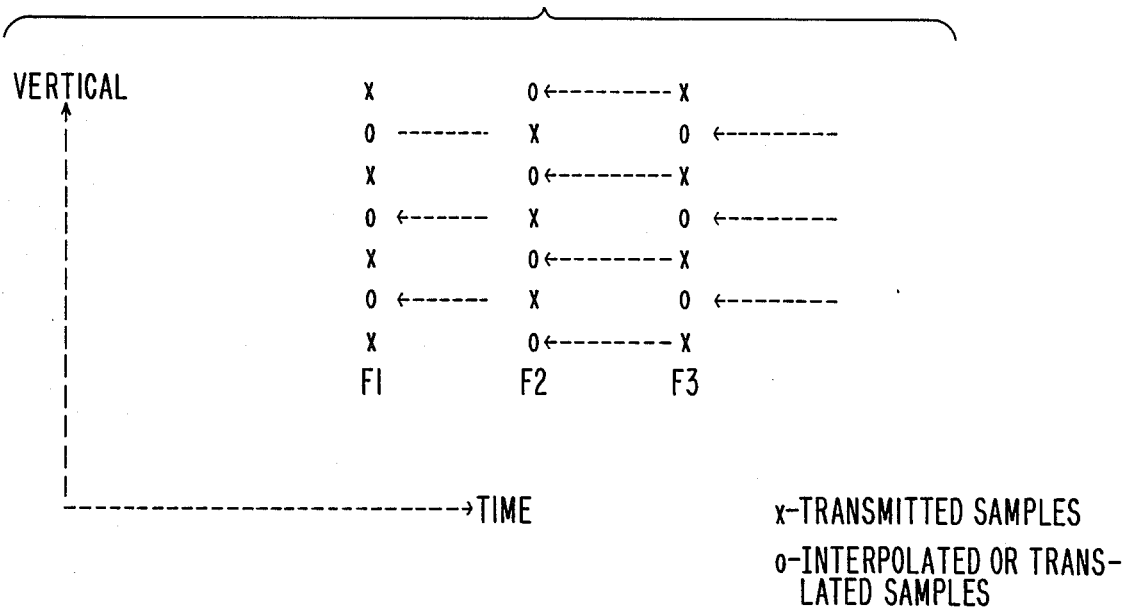
x—TRANSMITTED SAMPLES
o—INTERPOLATED OR TRANSLATED SAMPLES

FIG. 5  1050 TO 525 LINE ENCODER

525 TO 1050 LINE DECODER

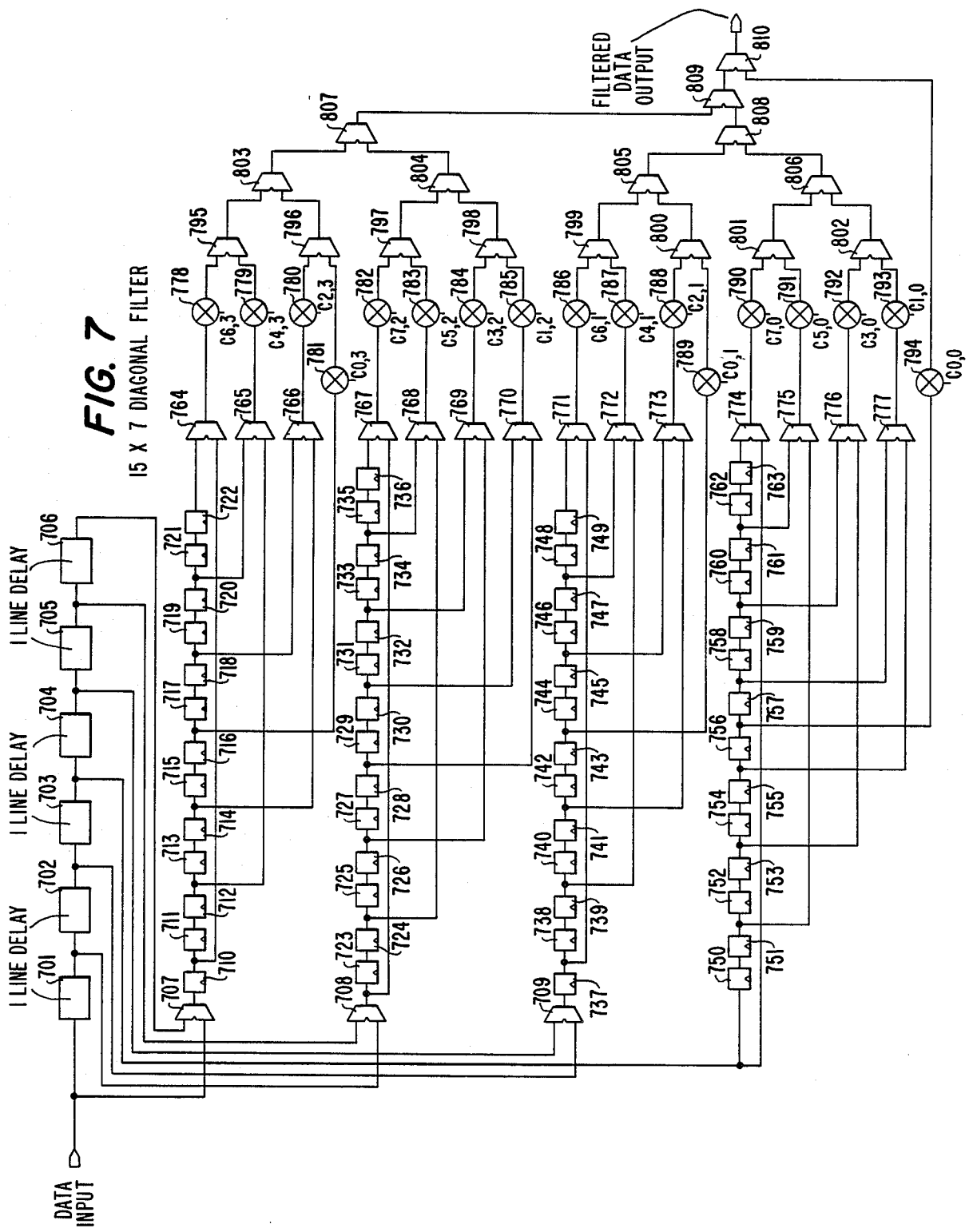

METHOD AND APPARATUS FOR INCREASING THE VERTICAL DEFINITION OF A TRANSMITTED TELEVISION SIGNAL

BACKGROUND OF THE INVENTION

1. Technical Field

This invention relates to the field of transmitting high definition television signals and, more particularly, to a method and apparatus for increasing the vertical definition of a transmitted television signal without increasing bandwidth.

2. Background Information

Television pictures are an assembly of horizontal lines, each line being modulated with an amplitude signal representing the luminance or chrominance component of the picture. These line signals are sequentially transmitted and received for display on a cathode-ray tube forming the original picture. Two separate line standards are predominant. In North America and Japan, television transmissions are based on 525 horizontal lines per picture. In Europe, Africa, Asia and Australia, television transmissions are based on 625 lines per picture. The higher the number of lines of an image, the higher its clarity or vertical resolution. In recent times, technology has become available to display many more television lines, which improves picture quality as it increases vertical definition. Components are also available which allow an increase in the bandwidth of the line signals which improves picture quality by increasing horizontal definition. Therefore, technology exists which allows for a much higher picture quality than is available from existing standard transmissions. This technology is known as High Definition Television (HDTV). In particular, methods have been proposed based on a display of 1050 lines, 1125 lines and 1250 horizontal lines. The main problem with these recent proposals is that there is no economical way to introduce such transmissions. The television receivers currently in use throughout the world will receive only 525 or 625-line transmissions and are incapable of displaying HDTV transmissions. The dominant cost of providing television service is the cost of programming which must be funded through, for example, advertising or pay-tv. Such methods of funding require the existence of a large audience. During any start-up phase of providing HDTV service, there will be no compatible receivers and therefore no possibility of recovering programming costs. Also the cost of an HDTV receiver is likely to be discouragingly high.

One way to avoid this difficulty is to introduce the concept of existing receiver compatible HDTV transmissions which can be converted to a signal of conventional format using a converter of low cost. Such a low-cost converter would allow display of the HDTV transmissions on a conventional receiver but achieve conventional picture quality. This approach encourages a more rapid growth of the viewing audience, since new subscribers to the service would not initially have to buy an expensive HDTV receiver but could acquire a low cost converter for their present television receiver. Only those subscribers who wish to achieve the higher picture quality available through HDTV would acquire the more expensive HDTV receiver.

Several approaches to the design of a compatible HDTV signal have been suggested, all based on an HDTV line standard which is a simple multiple of the existing line standard. For example, in North America where the existing transmission standard is 525 lines/picture, a suggested HDTV standard will employ 1050 lines (twice the conventional standard). Similarly in Europe, where the conventional standard is 625-lines/picture, a suggested HDTV standard is 1250 lines. This simple relationship between the conventional and HDTV display standards suggests transcoding between the two standards, for example, by discarding alternate lines or by re-interpolating missing lines. The present invention and its back-ground will be discussed throughout the present application in terms of the proposed 1050/525 lines standard applicable in North America, it being understood that the concepts apply equally to the 1250/625 line standards proposed in Europe. Small variations from the numbers indicated are possible while retaining the essential property of the present invention, where, in particular, alternate lines are decimated and reinterpolated during transcoding. Several design options have been proposed employing alternate methodology.

One suggested approach is to transmit a standard television signal and a supplemental signal. Thus, one component of the transmitted signal is directly compatible with conventional receivers without the requirement for any converter. The supplemental signal may be transmitted on a separate channel or multiplexed with the first signal such that existing receivers are not affected by it. HDTV receivers would receive both of these signals and use them to reconstruct a high-definition picture. In one such proposal, the supplemental signal consists of an analog signal carrying information relating to the difference between the 525 standard transmitted lines and the intervening 525 lines which must be reconstructed. Addition of the difference information to the transmitted compatible lines reproduces the missing lines. The supplemental signal may be transmitted in a second channel or on a subcarrier with the first signal.

The problem with these techniques is that they require absolute compatibility; that is, the first signal must be an essentially conventional composite National Television Subcommittee (NTSC) signal (or PAL/SECAM in Europe). These composite signals employ a color subcarrier which gives poor chrominance resolution. The color subcarrier is difficult to enhance for improved chrominance definition and introduces significant distortion to the luminance signal. With the NTSC standard, it is very difficult to adequately separate luminance and chrominance to form high quality signals as the basis for high-definition pictures.

On the other hand, absolute NTSC compatibility is probably not a stringent requirement. It is likely that any practical HDTV standard will include a capability for conditional-access (pay-tv) reception. Scrambled television signals require a transcoder for each receiver; therefore, any signal transmission format can be used, provided that the cost of transcoding to conventional NTSC is not unduly expensive in a subscriber decoder. The NTSC signal was standardized approximately 40 years ago and is now being overtaken by advancing technology. Since 1980, new composite signals (based on digital processing) have been developed which provide better picture quality than NTSC and which provide a better basis for HDTV. There are, for example, formats based on digital time compression for multiplexing luminance and chrominance components, i.e., Multiplexed Analog Components (or MAC) signals, also known as Time Multiplexed Components (TMC). When such signals are transmitted in 525-line format (e.g. 525-line MAC), transcoding to NTSC in a decoder may be achieved at low cost.

MAC signals do not employ a color subcarrier to carry the color information. Instead they employ time compression to multiplex luminance and color information within each transmitted television line. This technique is illustrated in FIG. 1. In the decoder, the luminance and chrominance components are stored and separately decompressed to give the full-line luminance and color signals required for display. This allows complete separation between the components and avoids the cross-interference effects associated with the NTSC color subcarrier. For this reason, most HDTV proposals have been based on time-compression techniques.

When the MAC signal employs a 525-line structure, it may be simply transcoded to a conventional NTSC signal in the decoder to maintain compatibility with existing receivers. This may be achieved using one or two low-cost custom integrated circuits.

The more encouraging proposals for HDTV start with a 525-line MAC/TMC signal which may be simply converted in a subscriber decoder to NTSC and at the origin of transmission to 1050-line component HDTV. The most important technical question that remains concerns the technique to be used to enhance the definition, particularly in the vertical direction, while maintaining the possibility of low-cost decoding to NTSC.

One further approach to compatibility would be to transmit all 1050 lines. Alternate lines could then be discarded at the subscriber decoder using a line memory store for the remaining lines, leaving a 525-line MAC signal ready for conversion to NTSC. HDTV receivers would display all 1050 lines.

The problem with this approach is the excessive bandwidth required for transmission of such a signal. For example, if it is required to double the horizontal bandwidth from 4 MHz (in NTSC) to 8 MHz (equivalent), and in addition to double the number of lines from 525 to 1050, the transmission bandwidth increases by a factor of 4. This is not an economic solution in terms of transmission costs due to the excessive demands on R. F. spectrum.

A modification of this approach has been suggested in which two separate 525-line signals are transmitted. A first MAC signal is available for direct conversion to NTSC, while an HDTV receiver decodes both signals to produce a 1050-line result. While this approach eliminates the need for memory stores in the NTSC-compatible decoder (transferring this cost to the HDTV receiver), it does not address the question of the excessive demand for R. F. spectrum.

Another approach which has been extensively investigated is the potential improvement in vertical definition achievable by employing interlace lines from previously transmitted fields to reinterpolate missing lines. Referring to FIG. 2, a 525-line interlace signal can be converted to a 525-line sequential signal (double the number of lines) by using lines from previous fields to reinterpolate missing lines. This technique has the potential to increase subjective vertical definition by approximately 50%. With appropriate sample structures, the use of information from previous fields has the potential to increase the definition in both the vertical and horizontal directions.

There are two problems with this approach and which apply to all techniques employing information from previous fields. The first is the consideration that the HDTV receiver will need to employ a field store (perhaps more than one) to reconstruct the entire HDTV image. Although field stores are not yet available at reasonable costs, it is predictable that manufacturing in sufficient volume will solve this problem in the forseeable future. The second objection is more severe. Interpolation of missing lines using information from previously transmitted fields is effective only for static picture elements. It is therefore necessary to employ more complex techniques for moving pictures.

Two approaches are being used experimentally to solve the problem:

(i) Detect moving elements of the scene, and (in areas of movement) employ intrafield interpolation (from surrounding lines of the same field).

(ii) Detect not only the fact of motion, but also its magnitude and direction, allowing interpolation from the appropriate segments of surrounding fields.

Neither of these approaches has yet provided a convincing demonstration that adequate representation of moving pictures can be achieved in a decoder that an HDTV subscriber could afford in the forseeable future.

One development of technique (i) above eliminates the need for motion detection in the consumer decoder. This method employs sophisticated equipment at the transmitter to detect motion in segments of the scene and signals this information to all decoders using a separate digital channel (digitally assisted television). This work is currently in its early stages; however, preliminary results suggest that a significant data capacity may be required. In order to be viable, data requirements associated with this approach must be reduced to acceptable levels without increasing the cost and complexity of HDTV decoders. Thus, it is clear that there remains a requirement for a viable alternative solution to the problem whereby bandwidth may be preserved, yet the HDTV subscriber, with either a conventional television receiver or a new HDTV terminal, may be economically served.

SUMMARY OF THE INVENTION

The problems and related problems of improving HDTV transmission and reception are solved by the principles of the present invention by enhancing the vertical definition of a MAC signal through processing within a single field. Through the present method and apparatus, a compatible 525-line MAC signal is provided in which the transmitted lines carry information about additional lines which are not transmitted. The extra information is carried at high video frequencies and is not processed by an inexpensive converter for a 525-line compatible receiver. The design of an NTSC compatible, inexpensive decoder receiving the same transmission simply involves the provision of a single low-pass filter to recover the 525-line signal of conventional vertical definition which may be converted to NTSC at low-cost for display on a conventional receiver. Conversely, the converter associated with an HDTV receiver processes the added high frequency information to achieve enhanced vertical definition for a 1050 line display.

The present processing method is applied to a primary source signal of 1050 lines in MAC format. It may be applied only to the luminance component, or applied separately to both luminance and chrominance components. The present method comprises the following steps:

Step 1. Sample the 1050-line source signal using an orthogonal sample pattern (FIG. 3). Apply a 2-dimensional diagonal filter.

Step 2. Drop alternate samples to leave a non-orthogonal 1050-line "quincunx" or figure of five sample pattern. This pattern supports full vertical and horizontal resolution provided the diagonal resolution has been limited in step 1.

Step 3. Sum each line with an adjacent line, either above or below it, effectively multiplexing the samples to reproduce an orthogonal sample structure with sample frequency fs.

Step 4. Discard alternate lines leaving a 525-line signal.

The first four steps are performed at or near the origin of transmission so as to leave a sampled 525-line signal for transmission which is practically free of aliasing when viewed in the 2-dimensional frequency plane. In other words, there are repeat spectrums tesselating with center frequency components so that missing line data may be reinterpolated from the high frequency repeat spectrums. High-frequency diagonal information in the repeat spectrum signal carries folded energy representing the high-frequency vertical information which existed in the original 1050 line signal. Effectively, diagonal resolution has been replaced by high-frequency vertical information.

The samples of the 525-line signal output of the two dimensional diagonal filter can be reconverted to analog form using a digital to analog (D/A) converter. In the digital domain prior to the D/A conversion or in the analog domain following the D/A conversion, a low-pass filter implements a characteristic which is skew-symmetric about fs/2 (where fs is the sample frequency).

Step 5. Apply the skew-symmetric sub-Nyquist filter. The skew-symmetric filtering conserves transmission bandwidth and permits reinterpolation. The analogue 525-line signal which results may be transmitted and is compatible with any decoder designed to receive an unprocessed 525-line signal of the same format. Upon reception, the folded energy at high frequency is simply removed using a low-pass filter for viewing on a conventional television set.

For subscribers owning an HDTV receiver, an HDTV decoder regenerates 1050 lines for display using the following additional steps:

Step 6. Apply a presampling skew-symmetric filter before or after A/D conversion or sampling. (Note that the characteristic of this filter may or may not contribute to the skew-symmetric characteristic of step 5).

Step 7. Sample the signal at frequency fs/2 either before or after Step 6.

Step 8. Demultiplex alternate samples to form two lines from each received line; that is, alternate samples are displaced vertically to form the missing line.

Step 9. Employ a two-dimensional interpolation to replace the missing samples and to recover an orthogonal sample pattern. This interpolator implements a diagonal filter characteristic. At the end of step 9 the result is a signal with 1050 lines with increased vertical definition ready for display.

The associated apparatus of the present invention simply involves, in combination, a phase lock loop, a synchronization pulse separator and timing generator for applying synchronizing and clocking inputs to various points in the circuit, a low pass filter, an A/D and a D/A converter, a two dimensional diagonal filter, switching and control logic and a skew-symmetric low pass filter for either encoding or decoding. A seven line diagonal filter is suggested for broadcast quality transmission, reception or intermediate baseband requirements while an inexpensive three or five line diagonal filter is suitable for implementation in an HDTV receiver. No full field memories are required nor are the present method or apparatus in any way limited to time reinterpolation of only static images.

BRIEF DESCRIPTION OF THE DRAWINGS

FIG. 1 is a graphical representation of a known B-Multiplexed Analog Components (B-MAC) television signal.

FIG. 2 is a graphical representation of a vertical signal over time showing a prior art line interlacing technique.

FIG. 7 is a schematic diagram of a seven line 15th order diagonal filter.

FIG. 8a shows the center frequency characteristic and FIG. 8b the frequency characteristic including high frequency repeat spectrums from which the 1050 line HDTV signal is reinterpolated.

FIGS. 9a, 9b and 9c show a first photograph of an image of 525 lines, a second photograph of an image following processing according to the present method and a third photograph of an image processed according to the prior art line interlace technique of discarding alternate lines and reinterpolating the missing lines, respectively.

DETAILED DESCRIPTION

Referring briefly to FIG. 1, there is shown a graphical representation of a B-MAC video signal comprising data, chrominance and luminance signals separated by a transition interval. It is the B-MAC video luminance signal that is shown processed according to the present invention by way of example the B-MAC signal being preferred for HDTV service in favor of the NTSC composite video signal. The chrominance or other video signal can be similarly processed according to the present invention.

Figure 3:
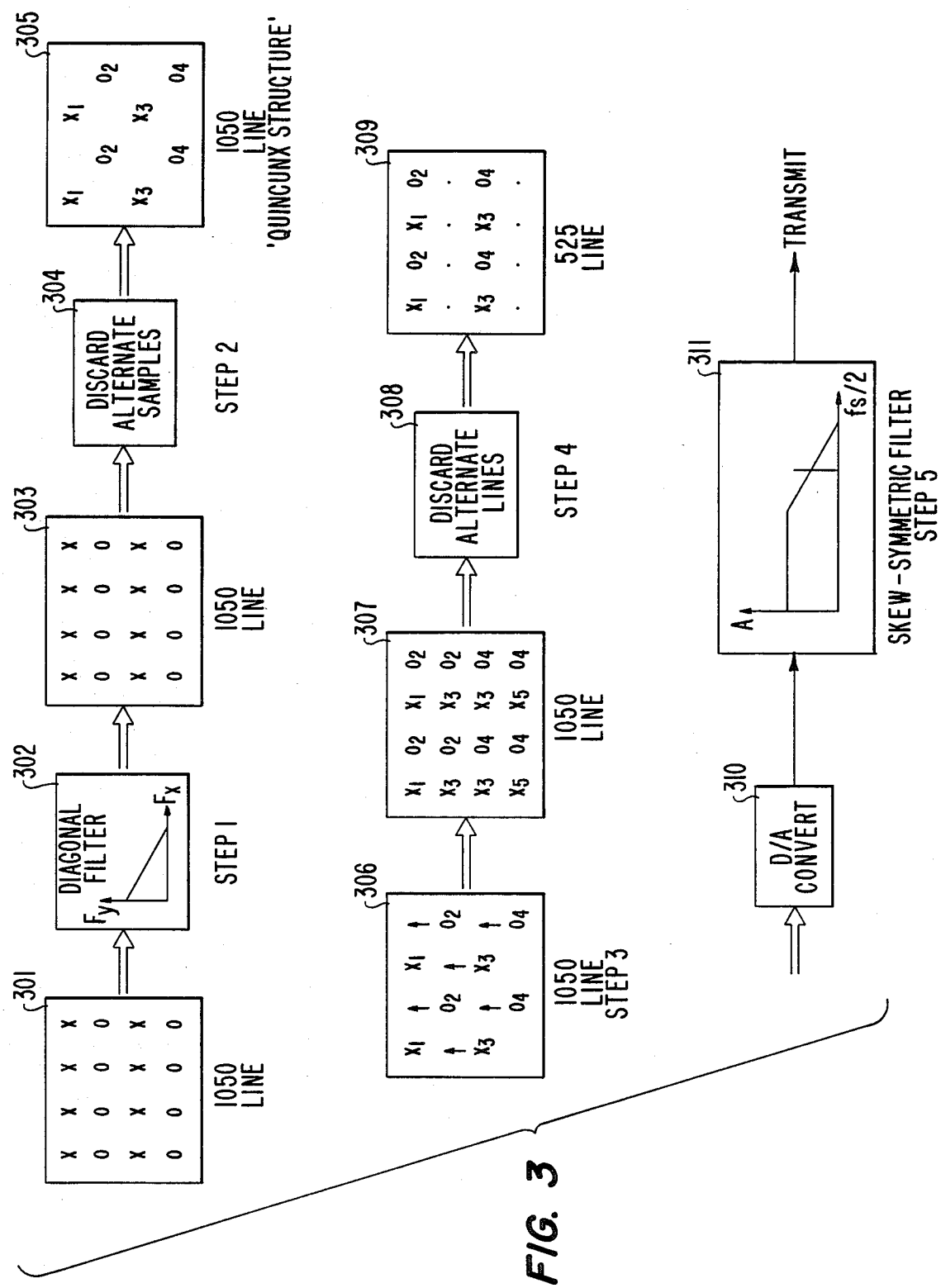
FIG. 3 is a flow diagram and pictorial representation of the present television signal processing method as applied at the origin of transmission.
Figure 4:
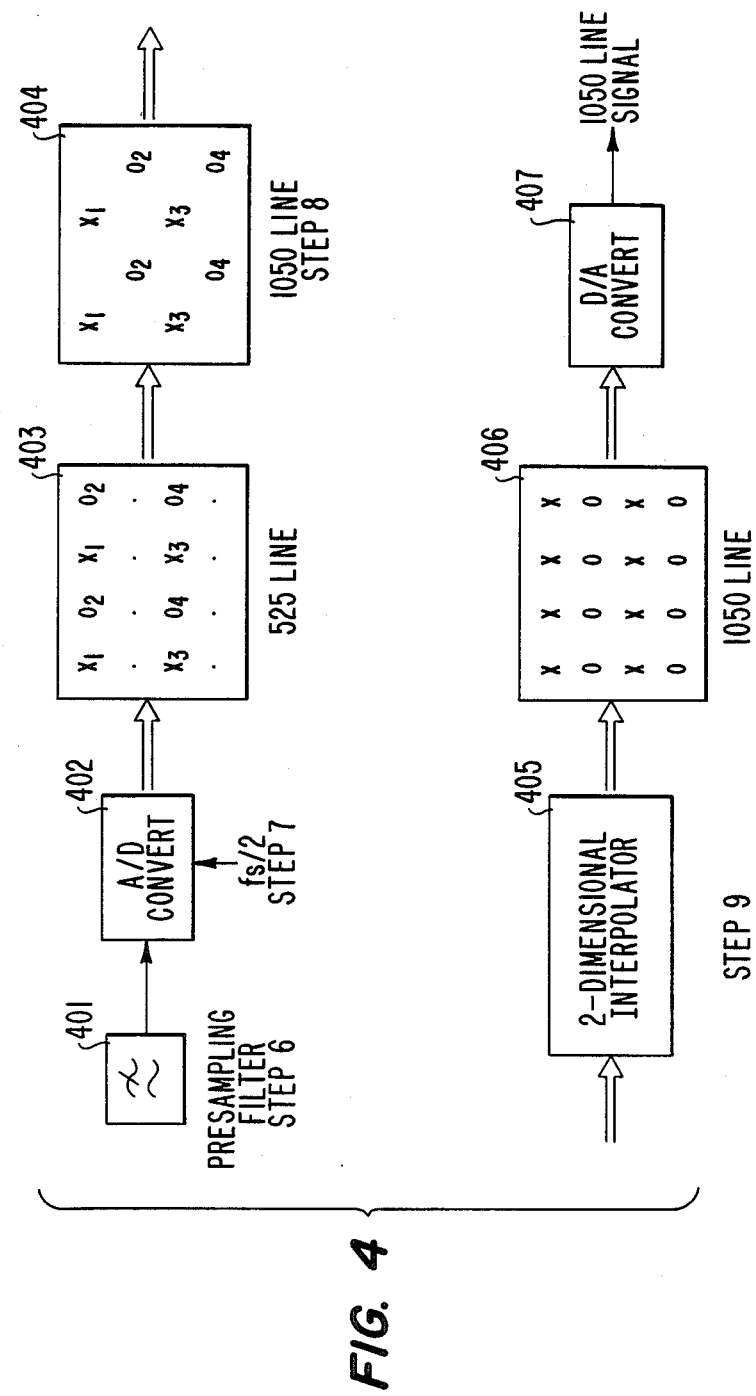
FIG. 4 is a flow diagram and pictorial representation of the present television signal processing method as applied upon HDTV signal reception.
Figure 5:
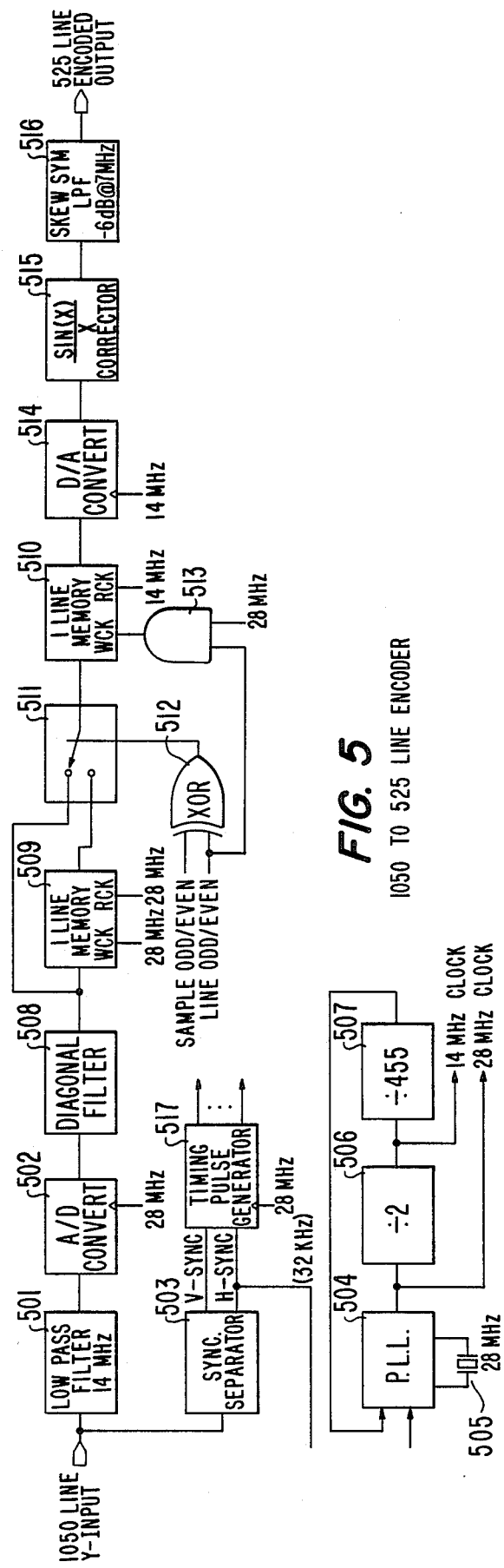
FIG. 5 is a schematic block diagram of an encoder according to the present invention.
Figure 6:
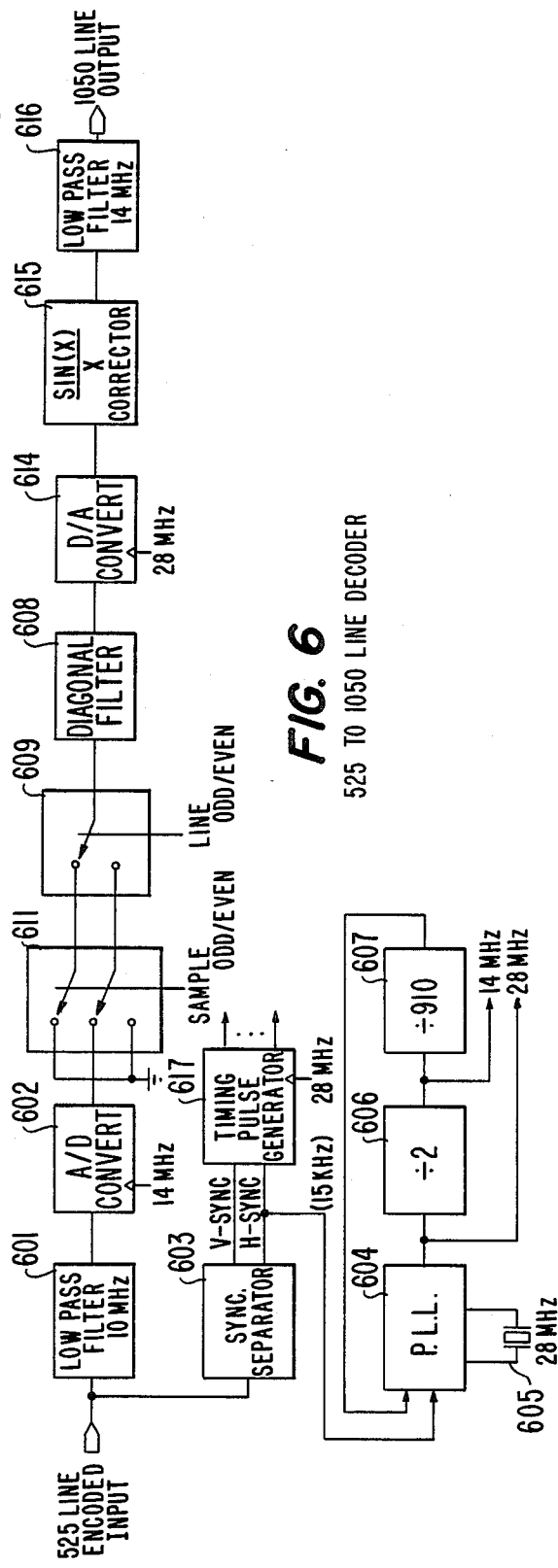
FIG. 6 is a schematic block diagram of a decoder according to the present invention.
Figure 8A:
FIGS. 8a and 8b are three dimensional graphical representations of the two dimensional frequency response of the filter of FIG. 7.
Figure 8B:
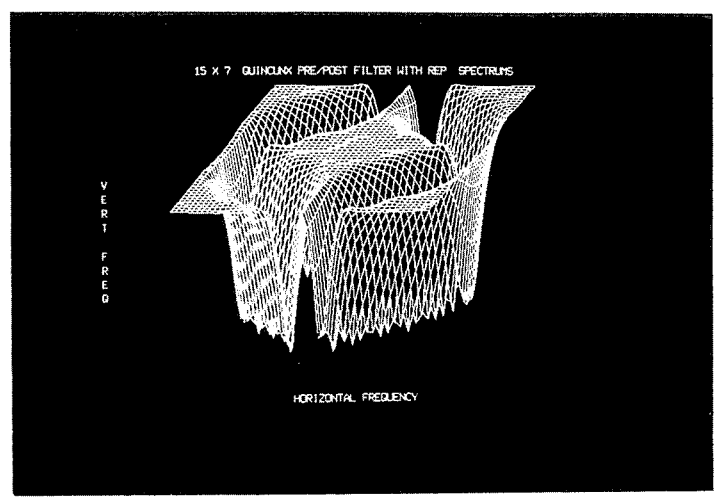

It is a 1050 line B-MAC Y-input signal that is shown provided as input to the apparatus of FIGS. 5 and 6 and is processed according to the method shown in flow diagram form in FIGS. 3 and 4. FIGS. 3 and 5 represent the method and apparatus respectively employed in encoding the 1050 line analog B-MAC signal in such a manner that a 525 line encoded output with folded high frequency repeat spectrum information may be transmitted with a conserved bandwidth to a receiver. Not shown in the drawings is a simple low-pass filter of an inexpensive HDTV converter at baseband video for eliminating the high frequency components so that a standard 525 line NTSC composite video signal is provided to a conventional receiver for display. repeat spectrums from which the 1050 line HDTV signal is reinterplated.

Figure 9A:
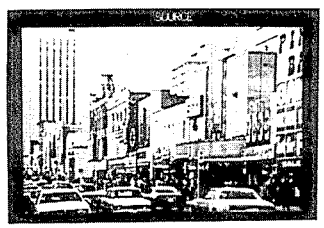
Figure 9B:

FIGS. 9a, 9b and 9c show a first photograph of an image of 525 lines, a second photograph of an image following processing according to the present method and a third photograph of an image processed according to the prior art line interlace technique of discarding alternate lines and reinterpolating the missing lines, respectively.

DETAILED DESCRIPTION

Referring briefly to FIG. 1, there is shown a graphical representation of a B-MAC video signal comprising data, chrominance and luminance signals separated by a transition interval. It is the B-MAC video luminance signal that is shown processed according to the present invention by way of example the B-MAC signal being preferred for HDTV service in favor of the NTSC composite video signal. The chrominance or other video signal can be similarly processed according to the present invention.

It is a 1050 line B-MAC Y-input signal that is shown provided as input to the apparatus of FIGS. 5 and 6 and is processed according to the method shown in flow diagram form in FIGS. 3 and 4. FIGS. 3 and 5 represent the method and apparatus respectively employed in encoding the 1050 line analog B-MAC signal in such a manner that a 525 line encoded output with folded high frequency repeat spectrum information may be transmitted with a conserved bandwidth to a receiver. Not shown in the drawings is a simple low-pass filter of an inexpensive HDTV converter at baseband video for eliminating the high frequency components so that a standard 525 line NTSC composite video signal is provided to a conventional receiver for display.

Referring more particularly to FIG. 3, there is shown in flow diagram form five steps of the present process which typically would be performed at the origin of broadcast. In box 301 is shown a pictorial representation of step 1, the digital sampling of the analog input B-MAC video signal. Alternate line samples XXXX and OOOO are shown which altogether comprise a sampled 1050 line or other high resolution HDTV video signal. The sampling is conducted at the Nyquist rate, for example, approximately 28 Mhz, in particular, 28, 636, 360 Hz.

Referring briefly to FIG. 5, this first step is represented in the form of circuit structure comprising a low pass filter 501 at baseband and for providing a filtered analog input to analog to digital converter 502 clocked at 28 MHz. The clock input is derived by feeding the incoming signal through synchronization generator 503 in a known manner. The approximately 32 kHz horizontal synchronization output of a synchronization generator 503 is provided to a phase lock loop 504. The phase lock loop 504 in turn is fed by a crystal controlled oscillator 505 operating at the Nyquist rate of approximately 28 MHz. The locked high frequency output of phase lock loop 505 is then applied directly to clock, for example, the analog to digital converter 502. It is also divided down to clock at half the Nyquist rate at divide-by-two circuit 506. It is further divided down by four hundred fifty-five at divider 507 for locking with the incoming horizontal synchronization signal at approximately 32 KHz.

Referring briefly to FIG. 3, at box 302 is shown pictorially the application of a two dimensional diagonal filter. In FIG. 5, the diagonal filter 508 is shown connected to the output of A/D converter 502. At the output of the filter is a diagonally filtered signal which is fed to a first temporary memory 509 or to a second line memory 510 responsive to switch 511 actuated by exclusive OR gate 512. Alternate samples of alternate lines form a figure of five or quincunx structure as shown in FIG. 3 at box 305.

Referring again to FIG. 5, second line memory 510 at one point in time comprises a single line of alternate samples where missing samples have been discarded. At another point in time, the first line memory 509 is switchably connected to second line memory 510 such that the missing slots are filled by an adjacent single line of alternate samples from first line memory 509. The process is more easily understood from a discussion of FIG. 3.

Box 303 represents the 1050 line signal after it is sampled but before it is diagonally filtered. In the diagonal filtering process, alternate samples on alternate lines are discarded as represented by box 304 leaving the 1050 line quincunx structure shown in box 305. While, for example, the line comprising samples $O_2 O_2$ would be passed to first line memory 509, the alternate line comprising samples $X_1 X_1$ are provided to second line memory 510. When the first and second line memories 509 and 510 are respectively filled with samples, a gating of first line memory 509 occurs to effectively add its samples to fill the gaps in the adjacent line stored in second line memory 510.

In box 306 of FIG. 3, this gating process is shown. The result is a 1050 line signal as shown in box 307 which is temporarily stored in the second line memory 510. One line of samples, for example, $X_3 O_2 X_3 O_2$ comprises redundant information of the alternate adjacent line of samples $X_3 O_4 X_3 O_4$ namely the alternate sample data $X_3$.

The next step in the process is the elimination of alternate lines and, hence, the redundant sample data as represented in box 308 of FIG. 3. What remains in box 309 is a 525 line signal comprising folded-in information about the missing lines. For example, samples $O_2$ and $O_4$ are folded in to a signal of 525 lines but provide samples of the alternate line signals as shown in box 305.

Referring to FIG. 5, this discard of the alternate lines is accomplished by gating only every other line out of second line memory 510. Input signal Sample Odd-/Even is provided to exclusive OR gate 512. Also, input signal Line Odd/Even is provided both to exclusive OR gate 512 and to AND gate 513 whose other input is a 28 MHz clock signal. The output of AND gate 513 triggers the gating of line sample data into the second line memory 510 while the gating out to the D/A converter is clocked at half the initial sampling rate or fs/2. In other words, a first complete line of samples, for example, $X_3 O_2 X_3 O_2$ is simply overwritten by a second line of samples $X_3 O_4 X_3 O_4$ in the second line memory 510. This line $X_3 O_4 X_3 O_4$ is the line permitted to be output as shown in box 309 to D/A converter 514, also shown in FIG. 3 as box 310. The D/A converter 514 is operated at the rate fs/2 or approximately 14 MHz where fs is the Nyquist sampling frequency.

The last step of the encoding process for transmission may occur either before or after the digital to analog conversion step at box 310. This last step is the application of a skew-symmetric low pass filter having a pass frequency at fs/2 as shown in box 311. If provided as shown in the analog domain, the design of the filter reduces to a simple R-C or L-C low pass filter. It is well known that an ideal analog low pass filter is not possible but is practically reachable in the digital domain. Consequently for broadcast quality, a digital skew-symmetric low pass filter is recommended. With digital downsampling and resampling, filtering may be cascaded without additional degradation of the transmitted or received video signal. However, digital filtering is more expensive and, consequently, an analog low pass filter is more appropriate to practical implementation.

In the apparatus shown in FIG. 5, the output of D/A converter 514 is shown provided to a wave corrector 515 for smoothing a sampled and held analog output of the D/A converter in accordance with sin x/x correction. The smoothed analog output is then provided to skew-symmetric low pass filter 515 having, for example, a 6 db loss characteristic at 7 kHz. Its output is a 525 line encoded output, as is the output of box 311 shown in FIG. 3. The output is then prepared for satellite, optical fiber, microwave, radio frequency or other transmission to a distant end and eventual reception at a conventional or HDTV receiver by modulation and multiplexing techniques in a known manner.

Decoding will now be explained with reference to FIGS. 4 and 6 assuming that the input to the process, a 525 line encoded input, has already been demultiplexed and/or demodulated if appropriate. Such decoding prepares the received signal for reception on a special 1050 line HDTV receiver by reinterpolating and reinserting missing lines.

According to FIG. 6, the received analog signal is low pass filtered, typically in the analog domain at low pass skew-symmetric analog filter 601 before it is sampled at analog to digital converter 602. As in FIG. 5, synchronization is derived from the incoming signal at synchronization separator 603. The horizontal synchronization signal at approximately 16 KHz is locked at phase lock loop 604 fed by a crystal controlled oscillator 605. The output frequency of oscillator 605 at approximately 28 MHz is divided down. At the output of divide-by-two circuit 606 is an fs/2 signal of approximately 14 MHz for operating, for example, A/D converter 602. At the output of divide-by-nine hundred ten circuit 607 is the horizontal synchronization signal of approximately 16 KHz. The horizontal and vertical synchronization signal outputs of synchronization separator 603 are fed to timing pulse generator 617 clocked at 28 MHz for generating timing pulses to various parts of the decoder circuit.

Referring to flow diagram FIG. 4, the presampling skew-symmetric filter 601 is represented by box 401. Because of the application of an analog non-ideal filter 601 in the HDTV subscriber's converter, there may be some degradation in the received analog output. With the anticipated future decrease in costs of construction of digital filters, a digital filter for the HDTV subscriber converter is foreseeable. Consequently, step 6 may succeed step 7 or box 402.

According to the positions of digital switches 611 and 609 with line samples of FIG. 6, a pattern of alternate empty lines is accomplished as shown in box 403 of FIG. 4. Box 403 is followed by box 404 wherein alternate samples are moved to respective positions in the empty lines. First, an odd/even sampling at switch 611 gathers odd and even samples together in a line as shown in box 403. At switch 609, the odd and even samples are placed in odd and even lines respectively forming a quincunx or figure of five pattern of non-redundant sample information as shown in box 404.

The output of digital switch 609 is provided as an input to two dimensional diagonal filter 608 for reinterpolating and reinserting missing samples. This is shown in FIG. 4 at box 405 and the reinterpolated samples XXXX, OOOO are shown in box 406. Now, the 1050 line signal is converted back to analog form for display at D/A converter 614, the conversion process shown in flow diagram FIG. 4 as box 407. Converter 615 is applied to the analog output of D/A converter 614 in accordance with a sin (x)/x correction algorithm. The output of corrector 615 is filtered to pass baseband 1050 line B-MAC signals at low pass filter 616 before it is converted for display on an HDTV receiver. The decoder shown in FIG. 6 is most conveniently built integrally with an HDTV receiver (not shown) or may be a separate unit depending on how HDTV service is initially implemented.

FIG. 7 is a schematic block diagram of a seven line fifteenth order two-dimensional diagonal filter. Such a filter is suggested for the construction of apparatus according to FIG. 5 when provided at the origin of HDTV broadcast service or at an intermediate point to achieve HDTV broadcast quality. A three or five line filter is of sufficient quality for implementation in a subscriber converter as might comprise the circuit of FIG. 6.

The sampling of television images is described in G. J. Tonge's paper, "The Sampling of Television Images," an experimental and developmental report (12/81) of the British Independent Broadcasting Authority. Described therein in FIGS. 12-17 are more economically viable three and five line filters of appropriate design for a subscriber converter than the seven line filter of FIG. 7.

All such filters are comprised of single line delay elements, single sample delay elements, adders and multipliers for multiplying particularly delayed samples by particular coefficients in combination depending on the desired complexity of the filter. The coefficients are taken from equations derived from a generic downsampling filter equation given by the discrete Fourier transform:

$$H(w) = \sum_{n=-N_1}^{n=N_2} h(n)\exp(-jnRw)$$

where $-N_1 \leq n \leq N_2$ is the range of sample positions, $h(n)$ is the impulse response, and R is the period defined by the integer n. For skew-symmetric filter design as applied to filters 516 and 601 about the frequency $\pi/2r$, $$H(\pi/R - W) = 1 - H(w).$$

The two dimensional discrete Fourier transform for design of diagonal filters 508 and 608 is given by:

$$H(w_1, w_2) = \sum_{n_1 n_2} h(n_1, n_2)\exp(-jn_1 R_1 w_1)\exp(-jn_2 R_2 w_2).$$

The various coefficients for a seven line fifteenth order filter are given by the following Table 1 and are applied at the multipliers as shown in FIG. 7.

TABLE 1

COEFFICIENT DISTRIBUTION

| 0 | C(6,3) | 0 | C(4,3) | 0 | C(2,3) | 0 | C(0,3) | 0 | C(2,3) | 0 | C(4,3) | 0 | C(6,3) | 0 |
|---|---|---|---|---|---|---|---|---|---|---|---|---|---|---|
| C(7,2) | 0 | C(5,2) | 0 | C(3,2) | 0 | C(1,2) | 0 | C(1,2) | 0 | C(3,2) | 0 | C(5,2) | 0 | C(7,2) |
| 0 | C(6,1) | 0 | C(4,1) | 0 | C(2,1) | 0 | C(0,1) | 0 | C(2,1) | 0 | C(4,1) | 0 | C(6,1) | 0 |
| C(7,0) | 0 | C(5,0) | 0 | C(3,0) | 0 | C(1,0) | C(0,0) | C(1,0) | 0 | C(3,0) | 0 | C(5,0) | 0 | C(7,0) |
| 0 | C(6,1) | 0 | C(4,1) | 0 | C(2,1) | 0 | C(0,1) | 0 | C(2,1) | 0 | C(4,1) | 0 | C(6,1) | 0 |
| C(7,2) | 0 | C(5,2) | 0 | C(3,2) | 0 | C(1,2) | 0 | C(1,2) | 0 | C(3,2) | 0 | C(5,2) | 0 | C(7,2) |
| 0 | C(6,3) | 0 | C(4,3) | 0 | C(2,3) | 0 | C(0,3) | 0 | C(2,3) | 0 | C(4,3) | 0 | C(6,3) | 0 |

The values for each of the coefficients are given by the following Table 2

TABLE 2

| | |
|---|---|
| C(0,0) = .5000 | C(4,1) = −.0214 |
| C(0,1) = .1799 | C(4,3) = −.0049 |
| C(0,3) = −.0030 | C(5,0) = .0141 |
| C(1,0) = .1919 | C(5,2) = .0064 |
| C(1,2) = .0279 | C(6,1) = .0045 |
| C(2,1) = .0643 | C(6,3) = −.0007 |
| C(2,3) = .0074 | C(7,0) = .0002 |
| C(3,0) = .0441 | C(7,2) = .0011 |
| C(3,2) = −.0202 | |

Coefficients for 3 and 5 line filters are shown in Tonge and are reproduced here for convenience, Table 3 providing coefficients for a three line filter and Table 4 for a five line filter.

TABLE 3

| 0 | −3 | 0 | 6 | 0 | −3 | 0 |
|---|---|---|---|---|---|---|
| 1 | 0 | 15 | 32 | 15 | 0 | 1 |
| 0 | −3 | 0 | 6 | 0 | −3 | 0 |

TABLE 4

| 0 | 0 | 10 | 0 | −10 | 0 | −10 | 0 | 10 | 0 | 0 |
|---|---|---|---|---|---|---|---|---|---|---|
| 0 | −5 | 0 | −60 | 0 | 130 | 0 | −60 | 0 | −5 | 0 |
| 1 | 0 | 25 | 0 | 230 | 512 | 230 | 0 | 25 | 0 | 1 |
| 0 | −5 | 0 | −60 | 0 | 130 | 0 | −60 | 0 | −5 | 0 |
| 0 | 0 | 10 | 0 | −10 | 0 | −10 | 0 | 10 | 0 | 0 |

FIG. 7 shows a detailed schematic block diagram of a seven line fifteenth order filter having a coefficient arrangement and values as shown in Tables 1 and 2 respectively. While the present seven line filter requires six separate line delay elements 701–706, a three line filter only requires two and a five line filter four. Also, while three initial line adders 707–709 are required in a seven line implementation, only two are required in a five line and one in a three line implementation respectively.

The first and last delayed line are added at adder 707, the second and next to last at adder 708 and so on until the middle line is dual processed. Altogether there are five processing lines. Four of the processing lines comprise single sample delay elements 710–722, 723–736, 737–749 and 750–763 respectively. The positioning of two single sample delay elements together in series in a particular line is the equivalent of a multiplication by a coefficient having zero value as shown in Table 1, 3 or 4. The respective samples, delayed as shown, are added at parallel adders 764–776 and multiplied by coefficients c(0,0)–c(7,2) at multipliers 778–794.

The discrete fourier transform elements at the outputs of the five processing lines are added together in five adder stages comprising adders 795–810. Only combinations of two element adders are shown because it is assumed that such elemental building blocks are most easily constructed in accordance with Very Large Scale Integration (VLSI) circuit fabrication techniques. In fact, the present seven line fifteenth order filter was fabricated of four such VLSI devices.

By way of example, an encoder and decoder have been fabricated for practicing the above-described method on a 525 line B-MAC signal. At the output of the exemplary encoder was provided a 262½ line signal having folded information in high frequency repeat spectrums for reinterpolation of the 262½ missing lines. FIG. 9a is a photograph of a source image of 525 lines. FIG. 9b is a photograph of an image of 525 lines reinterpolated from a 262½ line signal in accordance with the present method. FIG. 9c is a photograph of a reinterpolated signal according to the line interlacing prior art technique described briefly in the Background and Information section and shown in FIG. 2. Such an example demonstrates that the present method and apparatus may have application in providing services where the transmission media is of limited capacity but high resolution is desired, for example, picture telephone service or high resolution videotex service over telephone lines.

Thus there has been shown and described a method and apparatus for increasing the vertical definition of a transmitted television signal such that the signal may be transmitted at low bandwidth and yet, upon reception, achieve a picture quality having twice the vertical resolution without image degradation. The present method and apparatus represents one embodiment and shows one example of an application in the HDTV field and the conventional broadcast field and, yet, other embodiments and applications with yet other standard video signals would be easily accomplished by one skilled in the art without departing from the scope and spirit of the claims which follow.

We claim:

1. A method for enabling an increase in the vertical definition of a transmitted television signal of a predetermined number of horizontal lines comprising the steps of:

decimating alternate lines of the television signal to be transmitted and reinterpolating untransmitted alternate lines upon reception, the decimation of alternate lines of the television signal being accomplished by sampling the television signal to be transmitted at the Nyquist sampling rate, storing the television signal line samples in a line memory store, and spatially filtering the line samples diagonally in horizontal and vertical dimensions, alternate lines being discarded, providing a digital television signal of approximately half the predetermined number of lines for transmission.

2. A method for enabling an increase in the vertical definition of a transmitted television signal in accordance with claim 1, the filtering of the samples diagonally in two dimensions comprising the steps of:

ignoring alternate samples in each line to form a quincunx or figure of five sample pattern and replacing ignored samples of each alternate line with samples from either one or the other immediately adjacent line.

3. A method for enabling an increase in the vertical definition of a transmitted television signal in accordance with claim 2, the sampling of the television signal comprising the steps of:
converting the signal of approximately half the predetermined number of lines to an analog signal for transmission and filtering the analog signal about a frequency equal to half the Nyquist sampling rate.

4. A method for enabling an increase in the vertical definition of a transmitted television signal in accordance with claim 1, the reinterpolation of untransmitted alternate lines being accomplished by sampling the received television signal and interpolating missing samples diagonally in horizontal and vertical dimensions, untransmitted alternate lines being recovered providing a digital television signal of the predetermined number of horizontal lines.

5. A method for enabling an increase in the vertical definition of a transmitted television signal in accordance with claim 4, the interpolation of missing samples diagonally in horizontal and vertical dimensions comprising the steps of:
demultiplexing alternate samples from each line, deriving two sample lines of alternate samples for each sampled line forming a quincunx or figure of five pattern of alternate line samples and
replacing missing alternate samples of each sampled line by horizontal and vertical dimensional interpolation.

6. A method for enabling an increase in the vertical definition of a transmitted television signal in accordance with claim 4, the sampling of the received television signal comprising the steps of: filtering the received signal about a frequency equal to half the Nyquist sampling rate and
converting the received signal to digital signal line samples of approximately half the predetermined number of horizontal lines.

7. A method for enabling an increase in the vertical definition of a transmitted television signal in accordance with claim 1, including filtering the received television signal to remove high frequency components enabling display of the filtered television signal of approximately half the predetermined number of horizontal lines on a conventional television receiver.

8. Apparatus for enabling an increase in the vertical definition of a transmitted television signal of a predetermined number of horizontal lines, the apparatus comprising
means for sampling the television signal to be transmitted,
means for diagonally filtering the television signal samples spatially in horizontal and vertical dimensions to form a figure of five sample structure,
means for storing a horizontal line of such samples,
means for switching the samples and lines stored in the horizontal line storing means and
a low pass filter which is skew-symmetric about half the frequency of sampling the television samples, the output of the low pass filter being a signal comprising half the predetermined number of horizontal lines as the television signal to be transmitted.

9. Apparatus for enabling an increase in the vertical definition of a television signal in accordance with claim 8, the line storing means comprising first and second line memory means, the first line memory means being controlled by first logic circuit means for gating line samples to the second line memory means.

10. Apparatus for enabling an increase in vertical definition of a television signal in accordance with claim 9, the second line memory means being clocked at half the sampling rate.

11. Apparatus for enabling an increase in the vertical definition of a transmitted television signal of a predetermined number of horizontal lines comprising an encoder for encoding a video signal for transmission including,
means for sampling the television signal to be transmitted,
means for diagonally filtering the television signal samples spatially in horizontal and vertical dimensions to form a figure of five sample structure,
means for storing a horizontal line of such samples,
means for switching the samples and lines stored in the horizontal line storing means, and a low pass filter which is skew-symmetric about half the frequency of sampling the television signal, and
a decoder for decoding a video signal upon reception including
means for sampling the received video signal
means for switching the video signal samples into a figure of five sample pattern having alternate missing samples and
means for reinterpolating missing samples from the figure of five pattern having alternate missing samples, the output of the reinterpolation means being a signal comprising the predetermined number of horizontal lines.

12. Apparatus for enabling an increase in the vertical definition of a received television signal of a predetermined number of horizontal lines comprising
means for sampling the received video signal,
means for switching the video signal samples to spatially form adjacent lines of alternate samples for each line of samples received forming a figure of five sample pattern,
means for reinterpolating alternate missing samples for entry into the figure of five pattern, the result being complete lines of samples, and
means for processing the signals for display on a high definition television receiver.

13. A method at a receiver for enabling an increase in the vertical definition of a transmitted television signal of a predetermined number of lines, the transmitted signal having been spatially filtered to remove alternate samples on alternate lines and each pair of spatially adjacent lines having been combined to form one line for transmission, the method comprising the steps of:
sampling the received video signal,
switching the video signal sample to spatially reform two adjacent lines of alternate samples for each line of samples received, forming a figure of five sample pattern,
interpolating alternate missing samples for entry into the figure of five pattern, the result being complete lines of samples, and
processing the signals for display on a high definition television receiver.

14. A method at a transmitter for enabling an increase in the vertical definition of a television signal of a predetermined number of lines at a receiver, the method comprising the sequential steps of:

diagonally filtering the television signal in horizontal and vertical dimensions to spatially form a quincunx structure comprising alternate samples on alternate adjacent lines;

combining each pair of adjacent lines to replace filtered samples with samples from an immediately adjacent line; and discarding alternate lines leaving one line of each pair of adjacent lines for transmission.

15. A method for enabling an increase in the vertical definition of a transmitted television signal of a predetermined number of horizontal lines comprising the steps of:

decimating lines of the television signal to be transmitted and reinterpolating untransmitted lines upon reception, the decimation of lines of the television signal being accomplished by sampling the television signal to be transmitted at the Nyquist sampling rate, storing the television signal line samples in a line memory store, filtering the line samples diagonally in at least two non-temporal dimensions, and combining and discarding predetermined lines to provide a digital television signal of approximately half the predetermined number of horizontal lines for transmission.

16. A method for enabling an increase in the vertical definition of a transmitted television signal in accordance with claim 15, the filtering of the samples diagonally in non-temporal dimensions comprising the steps of ignoring alternate samples in each line to form a quincunx or figure of five sample pattern and the predetermined line combining comprising the step of replacing ignored samples of each alternate line with samples from either one or the other immediately adjacent line.

17. Apparatus for enabling an increase in the vertical definition of a transmitted television signal of a predetermined number of horizontal lines, the apparatus comprising a sample circuit for sampling the television signal to be transmitted, a filter for diagonally filtering the television signal samples in non-temporal dimensions to form a particular sample structure, a line store for storing a horizontal line of such samples, a switch for switching the samples of lines stored in the horizontal line storing means with other filtered line samples and a low pass filter which is skew-symmetric about half the frequency of sampling the television samples, the output of the low pass filter being a signal comprising half the predetermined number of horizontal lines as the television signal to be transmitted.

18. Apparatus for use with a high definition television receiver, the apparatus for enabling an increase in the vertical definition of a received television signal of a predetermined number of horizontal lines comprising a sampling circuit for sampling the received television signal of the predetermined number of horizontal lines, a switch for switching the television signal samples to spatially form two lines of samples for each line of samples received to form a particular sample pattern including incomplete lines of television signal samples, and an interpolator for introducing samples for entry into the particular sample pattern, the result of the interpolation being complete lines of television signal samples.

19. A method at a receiver for enabling an increase in the vertical definition of a transmitted television signal of a predetermined number of lines, the transmitted signal having been spatially filtered to remove certain samples on first and second predetermined lines and the first and second predetermined lines having been combined to form one line for transmission, the method comprising the steps of:

sampling the received video signal, switching the video signal samples to spatially reform the first and second predetermined lines of samples from each line of samples received forming a particular sample pattern, and interpolating samples missing from the reformed first and second predetermined lines for entry into the sample pattern, the result being complete lines of samples.

20. A method at a transmitter for enabling an increase in the vertical definition of a television signal of a predetermined number of horizontal lines at a receiver, the method comprising the sequential steps of:

diagonally filtering the television signal in at least two non-temporal dimensions to form a particular sample structure combining first and second predetermined lines for transmission by replacing filtered samples in the first predetermined lines with samples from the second predetermined lines; and discarding the second predetermined lines leaving half the predetermined number of horizontal lines for transmission.

21. Apparatus at a transmitter for enabling an increase in the vertical definition of a television signal at a receiver, the apparatus for encoding a high definition television signal for transmission having half the number of horizontal lines of the high definition television signal, the apparatus comprising a sampling circuit for sampling the high definition television signal, a filter for filtering the television signal spatially in two dimensions to form a particular sample pattern of incomplete lines of samples, a line store for storing a horizontal line of such samples, and a switch for switching the samples of horizontal lines stored in the line store with other filtered lines to form complete lines of samples for transmission.

22. Apparatus for enabling an increase an increase in the vertical definition of a transmitted television signal of a predetermined number of horizontal lines comprising an encoder for encoding a video signal for transmission, the encoder characterized by a digital filter for filtering the television signal in at least two non-temporal dimensions, a line store for storing a horizontal line of such samples and a switching circuit for switching the samples of lines stored in the line store with samples of other filtered lines to form complete lines of samples for transmission, and a decoder for decoding the video signal upon reception, the decoder characterized by a switch for switchably reforming two lines of samples for each line received, a digital filter for filtering the reformed lines to form a particular sample structure having missing samples and an interpolator for introducing samples missing from the particular sample structure.

* * * * *